April 9, 1957 R. G. PIETY 2,787,906
APPARATUS FOR DETERMINING TEMPERATURE CONDITIONS IN A WELL
Filed June 30, 1952 2 Sheets-Sheet 1
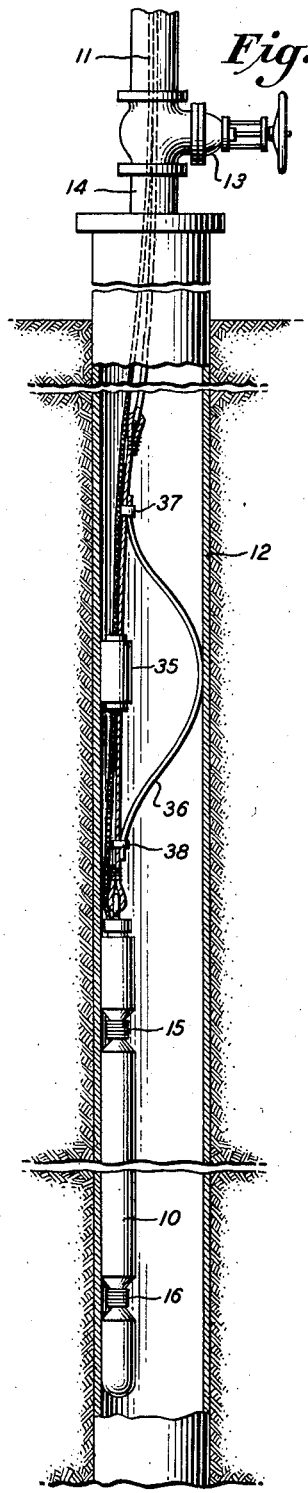
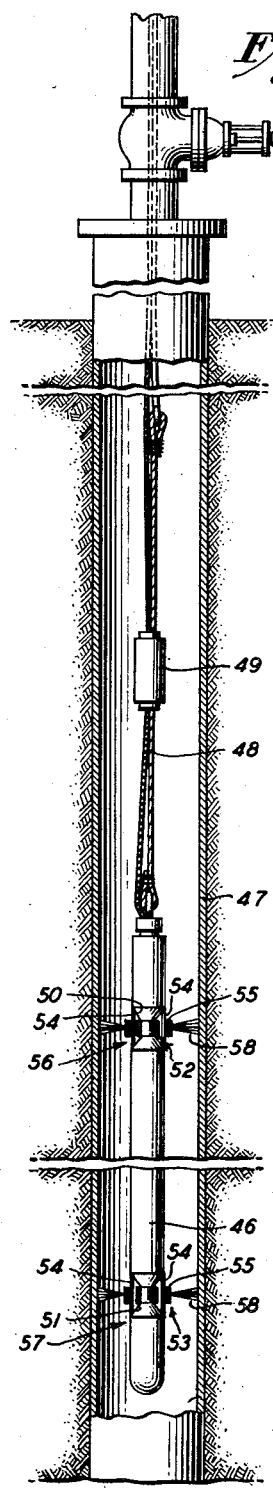
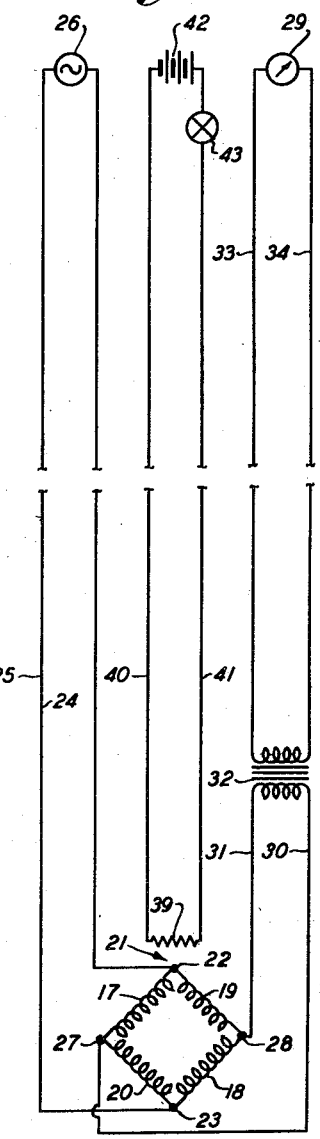
INVENTOR.
Raymond G. Piety
BY Hudson & Young
ATTORNEYS April 9, 1957 R. G. PIETY 2,787,906
APPARATUS FOR DETERMINING TEMPERATURE CONDITIONS IN A WELL
Filed June 30, 1952 2 Sheets-Sheet 2

INVENTOR.
BY Raymond G. Piety
ATTORNEYS

United States Patent Office

2,787,906
Patented Apr. 9, 1957

2,787,906

APPARATUS FOR DETERMINING TEMPERATURE CONDITIONS IN A WELL

Raymond G. Piety, Bartlesville, Okla., assignor to Phillips Petroleum Company, a corporation of Delaware Application June 30, 1952, Serial No. 296,453

3 Claims. (Cl. 73—155)

This invention relates to apparatus for making measurements in a well, particularly temperature measurements which are useful in locating sources of entry or loss of drilling mud or, in water flood wells, of water.

In oil wells, an increase in temperature is observed proceeding downwardly through the bore. In typical wells, the temperature gradient is of the order of 0.01° F. per foot. In operations utilizing drilling mud, where a portion of the mud is escaping into the formations being drilled, there will be an abrupt change in temperature of considerably greater magnitude than the change in temperature produced by the normal gradient. Similarly, in water flood wells, if the water is leaking into a formation adjacent the well, a temperature change will be observed which departs from that produced by the normal temperature gradient. Such effects also occur when unwanted fluids infiltrate the well through casing leaks from the adjoining formations.

It is an object of this invention to provide apparatus for accurately measuring temperature gradients, particularly for the purpose of determining where a leak or point of entry of fluids occurs.

It is a further object to provide an apparatus which can be conveniently inserted into or removed from a pressurized water injection well.

It is a further object to provide such an apparatus of simple construction which is economical to manufacture.

Various other objects, advantages and features of the invention will become apparent from the following detailed description taken in conjunction with the accompanying drawings, in which:

Figure 1 is a view of the apparatus of this invention suspended in a well;

Figure 2 is a schematic diagram of the electrical circuit used in connection with the apparatus;

Figure 3 is a view of a modified form of the apparatus of this invention suspended in a well;

Figure 4:
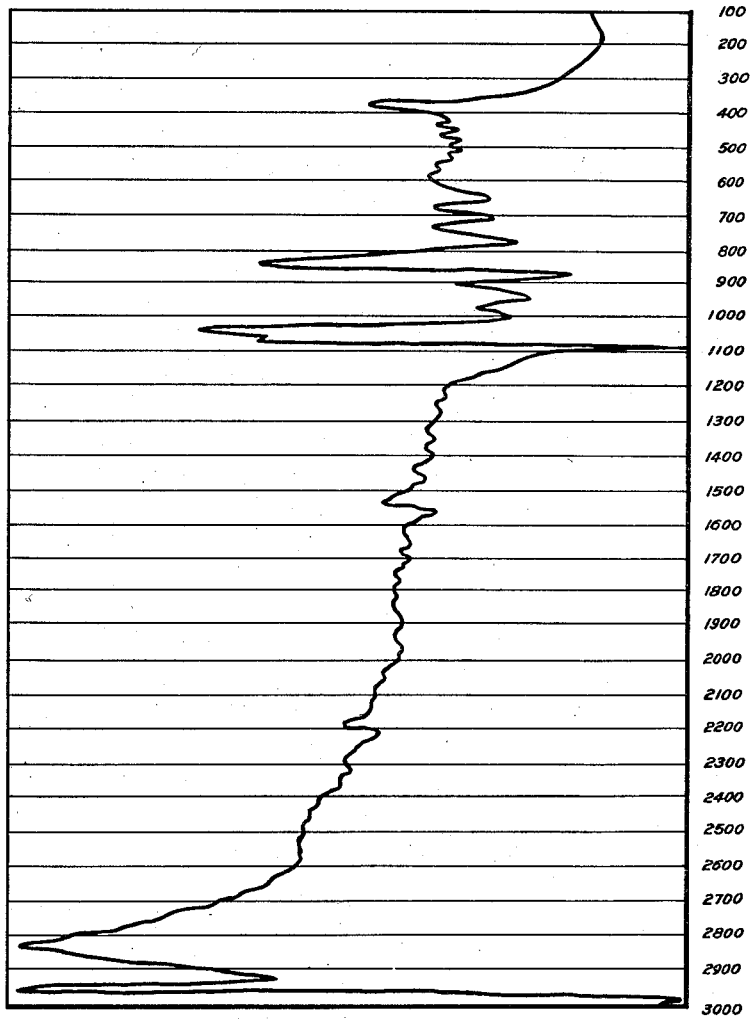
Figure 4 is a view of a log made with the apparatus of this invention.

Referring now to Figure 1, I have shown an elongated tool 10 suspended by a cable 11 in a well provided with casing 12. The diameter of the tool is such that it will pass through a water input gate valve, usually a two inch valve. Such a valve is indicated by reference numeral 13 as being located in a water supply pipe 14. Accordingly, the tool can be completely inserted into and removed from a pressurized water flood well without extensive disassembly of the surface structure of the well.

At the respective opposite ends of the tool 10 are coil units 15 and 16, each unit including two coils wound together about a recessed portion of the tool, the wires preferably being lacquer covered copper wires. The two coils can be wound together in any suitable manner.

For example, two wires at a time, one for each coil, can be wound in unitary fashion about the core. Alternate layers of the winding may be used for the two different coils. Again, the coils can be wound side by side upon the core. Coil unit 15 includes coils 17 and 18, Figure 2, while coil unit 16 includes coils 19 and 20. It will be noted that the coils of each unit define opposite arms of a Wheatstone bridge circuit generally indicated by reference numeral 21.

Electrical energy, preferably alternating current, is supplied to one pair of opposite corners 22, 23 of the bridge by leads 24 and 25, respectively, which leads extend through the supporting cable 11 to the surface where they are connected to a current source 26. The other pair of opposite corners 27 and 28 of the bridge is connected to an indicating device 29 at the surface, it being understood that the term "indicating device" contemplates the use of a sensitive meter, a recorder, or any other instrument for sensing the output voltage of the system. The aforesaid connection is made by leads 30, 31 which connect the corners 27, 28 to the primary winding of a transformer 32, the secondary winding of which is connected by leads 33 and 34 extending through the cable to the surface indicator 29.

In operation, as the device is lowered into a well, the lower coil unit 16 will be subjected to a higher temperature than the upper coil unit 15 due to the normal temperature gradient of the well. Due to the elongated nature of the tool, the coil units are separated a suitable distance, for example, 10 feet, so that there is a sufficient temperature difference as to slightly unbalance the bridge and produce a normal reading on indicator 29. When the tool reaches a position where there is an abnormal change in temperature due to leakage or infiltration of a fluid out of or into the well, there will be an increased temperature difference between the locations at which coil units 15 and 16 are disposed. Such a condition might result in an increased resistance of the coils 17 and 18 forming unit 15 due to the subjection thereof to a high temperature, and such an effect produces a further unbalance of the bridge which can be observed at indicator 29. Similarly, an increase in temperature of the coils 19, 20 of unit 16 would cause the resistance of these arms of the bridge to increase with the resultant production of an unbalance voltage readable by meter 29.

Due to the fact that four coils are utilized and that the two coils of each set form opposite arms of the bridge, the sensitivity of the circuit is greatly increased since the unbalance produced by a given temperature change is, in effect, doubled by causing the change to affect the resistance of two opposite arms of the bridge. Furthermore, the bridge is quite insensitive to temperature changes affecting both coil units simultaneously since such temperature changes will cause a corresponding increase or decrease in the resistance of all the arms of the bridge.

Further in accordance with the invention, I provide a temperature changing unit 35 secured to the cable 11 a short distance above the tool 10. In some cases, the heater can be disposed below the tool 10 or it may form an integral part of the tool and be located between the two coil units. The unit 35 is urged into engagement with a side wall of the casing 12 by a suitable spring, for example, a leaf spring 36 secured at points 37 and 38 to the cable above and below the unit 35, respectively. The action of the spring 36 also forces the tool 10 to rest against one wall of the casing when the tool is lowered into a well. Preferably and advantageously, the unit 35 is an electrical resistance heater denoted by reference numeral 39 in Figure 2, this heater being connected by leads 40, 41 incorporated in the cable 11 to a battery or other suitable current source 42 and a switch 43 at the surface.

The purpose of the unit 35 is to set up an artificial temperature gradient by heating or cooling the well fluid. Although the use of the heater or cooler is an optional feature, it is very advantageous in cases where a survey is made to locate casing leaks in a water injection well, the input water being warmer than the ground at the top of the well and cooler than the ground at the bottom of the well so that, at the region where the temperature of the input water is the same as the ground temperature, the gradient set up in the well is quite small due to the low rate of heat exchange between the water and ground. In such cases, the heater or cooler 35 sets up an artificial temperature gradient and thereby increases the sensitivity of the bridge circuit to tempereature changes caused by inflowing or outflowing water.

In a water input well, of course, the water flows downwardly and the measurement can, therefore, be made with the instrument stationary or moving downwardly at a rate slower than the velocity of movement of the water. In each case, the water traverses the temperature changing device 35 before reaching the coil sets 15 and 16. If the water in the well is stationary, the measurement is taken while the tool 10 is being moved upwardly so that the water is affected by the temperature changer 35 before it impinges upon the coil sets 15 and 16.

The use of the spring 36 to cause the heater and tool to be urged against the wall of the casing is advantageous because, where the flow of water or other fluid in a well is linear, the velocity of flow at the center is twice the average velocity of flow adjacent the casing. Accordingly, where the temperature gradient is low, it can be more easily measured in the relatively slow flowing region adjacent the casing, rather than at the relatively rapid flowing region at the central part of the casing.

In Figure 3, I have shown a modified arrangement of the apparatus of this invention. In this case, an elongated tool 46 is suspended within well casing 47 by a cable 48 which incorporates a heater 49 or other temperature changing device. The tool 46 includes recessed portions 50 and 51 which carry coil units 52 and 53 similar to the coil units 15 and 16, respectively, of Figure 1. Overlying each recessed portion are a plurality of strips or ribs 54 of spring material which support the respective central annular portions 55 of a pair of brush packers 56 and 57. Each packer has its annular central portion 55 formed from hard rubber or other suitable material, in which are embedded the inner ends of a series of bristles 58, these bristles being longer than the distance from the central portion 55 to the casing 47. Preferably and advantageously, the bristles are impregnated with a material such as grease to retard the flow of liquids therethrough. The detailed construction of the packers 56 and 57 can be the type shown by my copending application, Serial No. 77,634, filed February 21, 1949, entitled Packing Device, and I contemplate that any of the various types of packers disclosed in this copending application can be utilized in the manner illustrated by Figure 3.

The brush packers are advantageous in that they permit the tool to be centrally located within the casing and concentrate the flow of liquid in the well so that all of the liquid flows closely adjacent the coil units 52 and 53 with a resultant substantial increase in sensitivity. Further, the effect of horizontal temperature gradients in the well liquids is substantially or completely eliminated. Desirably, in some cases, the strips or ribs 54 are bowed inwardly so that the outer edge of the central support 55 is positioned within the associated recess 50 or 51. As a result, even with the brush packers attached to the tool, it can still be passed through a small valve, as on a water injection well.

Figure 5:
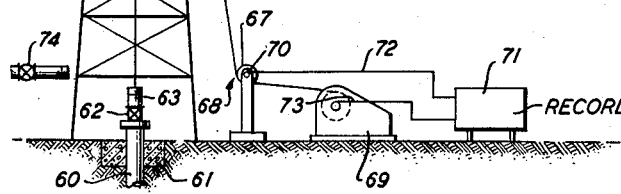
Figure 5 is a view of the uphole apparatus which can be used with either the system of Figure 1 or the system of Figure 3.

In Figure 5, I have shown the uphole apparatus associated with a typical water injection well. In this figure, the upper end portion 60 of the casing is set in concrete 61 and is provided with a gate valve 62 to which is attached a short threaded nipple 63. The upper end 64 of the cable passes over a sheave 65 mounted at the top of a derrick 66 and, thence, downwardly along the sheave 67 of a depth feeler wheel assembly 68 to a hoist 69. Rotation of the sheave 67 produces intermittent actuation of a switch 70 or other electrical component which is transmitted to a recorder 71 by a lead 72 and a return ground connection. Such devices are well known and provide an indication of the depth to which the tool assembly is lowered by the cable upon the recorder chart. The hoist 69 is provided with slip rings, one of which is indicated at 73 so that electrical connections are made from the conductors within the cable to the recorder 71 in the manner illustrated in connection with Figure 2. The recorder unit can also include the current sources indicated in Figure 2.

It will be noted that, when it is desired to remove the leak-detecting tool, valve 62 can be opened and the tool assembly lifted therethrough. Thereupon, an elbow is connected to nipple 63 and to an adjacent end 74 of a water injection pipe so that return of the well to water injection operation is facilitated.

In Figure 4, I have shown a log taken with the apparatus of Figure 1. It will be noted that temperature anomalies due to leakage of water into the well occur at levels of 375, 825, and 1050 feet. The large temperature anomaly at 3000 feet indicates the lower end of the casing which was 3000 feet deep in the particular well being logged.

It will be evident, therefore, that I have achieved the objects of my invention in providing a system for measuring temperature changes in a well which are indicative of points of entry or loss of drilling mud or water in ordinary wells and in water flood wells. The coils by which the measurements are obtained are mounted upon a tool of simple and rugged construction which protects the coils from contact with the casing and affords excellent thermal contacts between the coils and the well fluid. Finally, I have provided a means for producing an artificial temperature gradient where this is desirable and of urging the tool assembly against the sides of the casing where it is the most sensitive to temperature variations within the well, the spring structure and tool being of sufficiently small diameter that they can be readily inserted through the gate valve in a conduit by which injection water is forced into a water flood well.

While the invention has been described in connection with present, preferred embodiments thereof, it is to be understood that this invention is illustrative only and is not intended to limit the invention.

I claim:

1. Apparatus for determining temperature conditions in a well which comprises, in combination, a casing in a well, a gate valve at the top of said casing, a derrick having a sheave supported above said gate valve, a hoist, a depth feeler wheel, a cable extending from said hoist into contact with said feeler wheel, thence upwardly to said sheave, and thence downwardly through the gate valve to the casing, an elongated tool secured to said cable within said casing, a pair of coils carried by said tool and disposed at a location adjacent one end of said tool, a pair of coils carried by said tool and disposed at a location adjacent the other end of said tool, said coils constituting resistance elements whose resistance varies with temperature, leads connecting said coils in a Wheatstone bridge circuit such that the coils at each end of the tool define opposite arms of said bridge, a current source connected to one pair of opposite corners of said bridge, an indicator connected to the other pair of opposite corners of said bridge, an electric heating unit secured to said cable and spaced from said tool, means for supplying electrical energy to said heater to heat the well fluids, the leads effecting the described electrical connections extending through the cable to the hoist and, thence, through slip rings to a recorder unit, and an elongated leaf spring secured to the cable at opposite ends of the heater so as to force the heater and tool into engagement with the well casing.

2. Apparatus for determining temperature conditions in a well which comprises, in combination, an elongated tool, a cable secured to said tool for suspending same in a well, a structure secured to said cable including a spring urging the cable and the tool against the side of the well casing, a pair of coils carried by said tool and disposed at a location adjacent one end of said tool, a pair of coils carried by said tool and disposed at a location adjacent the other end of said tool, said coils constituting resistance elements whose resistance varies with temperature, leads connecting said coils in a Wheatstone bridge circuit such that the coils at each end of the tool define opposite arms of said bridge, a current source connected to one pair of opposite corners of said bridge, and an indicator connected to the other pair of opposite corners of said bridge.

3. Apparatus for determining temperature conditions in a well which comprises, in combination, an elongated tool, a cable secured to said tool for suspending same in a well, a pair of coils carried by said tool and disposed at a location adjacent one end of said tool, a pair of coils carried by said tool and disposed at a location adjacent the other end of said tool, said coils constituting resistance elements whose resistance varies with temperature, leads connecting said coils in a Wheatstone bridge circuit such that the coils at each end of the tool define opposite arms of said bridge, a current source connected to one pair of opposite corners of said bridge, an indicator connected to the other pair of opposite corners of said bridge, an electrical heating unit secured to said cable and spaced from said tool, an elongated leaf spring secured to the cable at opposite ends of said heater so as to force the heater and tool into engagement with the well casing, and means for supplying electrical energy to said heater to heat the well fluids.

References Cited in the file of this patent
UNITED STATES PATENTS

| | | |
|---|---|---|
| 1,099,199 | Parker | June 9, 1914 |
| 2,238,015 | Doll | Apr. 8, 1941 |
| 2,290,075 | Schlumberger | July 14, 1942 |
| 2,311,757 | Jakosky | Feb. 23, 1943 |
| 2,334,475 | Claudet | Nov. 16, 1943 |
| 2,379,138 | Fitting et al. | June 26, 1945 |
| 2,383,455 | Abadie | Aug. 28, 1945 |
| 2,517,455 | Waters | Aug. 1, 1950 |
| 2,580,182 | Morgan | Dec. 25, 1951 |
| 2,654,433 | Piety | Oct. 6, 1953 |